Apr. 17, 1923.

E. B. THATCHER 1,452,447

WATER SEPARATOR FOR AIR TANKS

Filed July 30, 1921

Inventor
Emerson B. Thatcher

By Whittemore Hulbert Whittemore
 & Belknap
    Attorneys

Patented Apr. 17, 1923.

1,452,447

UNITED STATES PATENT OFFICE.

EMERSON B. THATCHER, OF MARINE CITY, MICHIGAN.

WATER SEPARATOR FOR AIR TANKS.

Application filed July 30, 1921. Serial No. 488,746.

*To all whom it may concern:*

Be it known that I, EMERSON B. THATCHER, a citizen of the United States of America, residing at Marine City, in the county of St. Clair and State of Michigan, have invented certain new and useful Improvements in Water Separators for Air Tanks, of which the following is a specification, reference being had therein to the accompanying drawings.

The invention relates to compressed air systems and has for its object a simple means of separating from the air the water condensate. To this end the invention consists in the construction as hereinafter set forth.

In the installation of compressed air systems great difficulty is experienced by reason of the water condensate. Various forms of separators have heretofore been used in connection with such systems, but these are complicated and expensive to install. It is the object of the present invention to avoid such complication and expense and to obtain an effective separation by simple means. As shown, A is the storage tank, B the inlet conduit from the compressor (not shown), and C the outlet conduit. In its simplest form my improvement consists in extending the inlet conduit B through the top of the tank A and downward therein to a point near to the bottom. The outlet conduit C enters the tank at a point near the top thereof and is extended inward for a short distance as indicated at D. With this arrangement I have found that the air discharged through the conduit C is free from moisture and the condensate will collect in the bottom of the tank A. The reason for this, as I understand it, is that the water vapor originally in the air and which is condensed either by compression or cooling will collect on the walls of the portion of the conduit B which extends vertically downward in the tank and will drop off from the lower end of said conduit into the bottom of the tank. The ascending current of air moves so slowly on account of the greatly increased cross-sectional area of the tank that very little of the water is carried out. Condensation will also occur upon the inner walls of the tank, but the inwardly extending portion D of the outlet conduit C will break the continuity of surface and will prevent the condensate from being carried out with the air.

Figure 1:
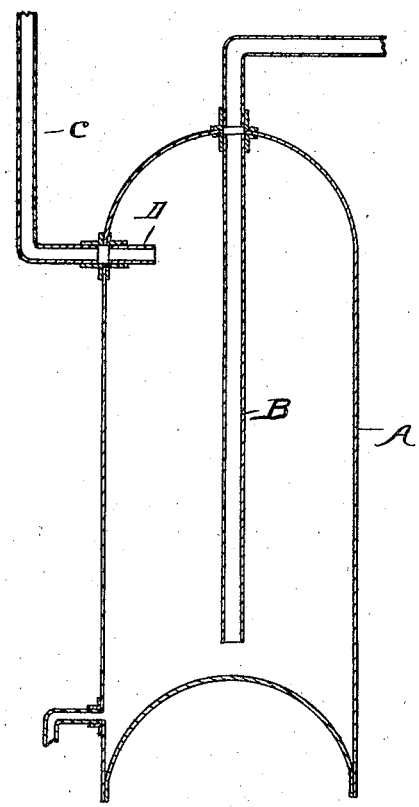
Figure 1 is a longitudinal section through the storage tank of a compressed air system, showing my improvement applied thereto.
Figure 2:
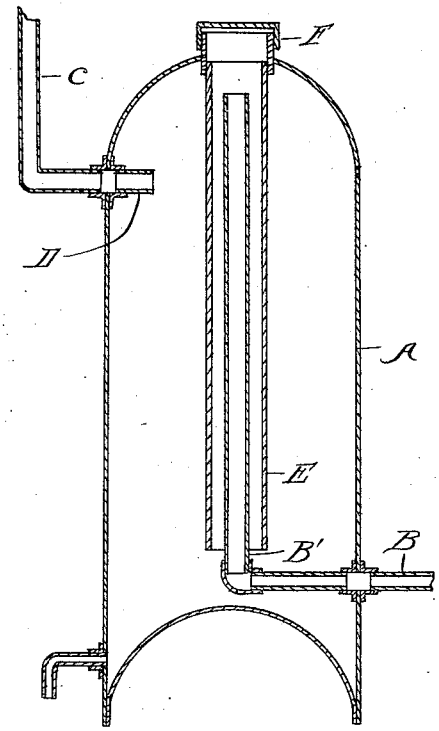
Figure 2 is a similar view of a modified construction.

In the modified construction shown in Figure 2, the inlet conduit B' enters at the bottom or lower portion of the tank and extends upward. A larger conduit E is placed to surround the conduit B' and is suspended from the top of the tank by a fitting F, while its lower end is opened. This will increase the amount of condensing surface, but will otherwise act the same as shown in Figure 1.

What I claim as my invention is:

The combination with an air storage tank, of an inlet conduit therefor having a portion extending from the upper end of the tank vertically downward to near the bottom thereof and provided with another portion which extends within said first-mentioned portion vertically upward and is in open communication therewith at its upper end.

In testimony whereof I affix my signature.

EMERSON B. THATCHER.